US010883364B2

(12) United States Patent
Kaur et al.

(10) Patent No.: US 10,883,364 B2
(45) Date of Patent: Jan. 5, 2021

(54) SEISMIC BASED FRACKING FLUID DISPOSAL

(71) Applicant: ENT. SERVICES DEVELOPMENT CORPORATION LP, Houston, TX (US)

(72) Inventors: Satwant Kaur, Mountain View, CA (US); Larry Schmidt, Rutledge, GA (US)

(73) Assignee: ENT. SERVICES DEVELOPMENT CORPORATION LP, Houston, TX (US)

(*) Notice: Subject to any disclaimer, the term of this patent is extended or adjusted under 35 U.S.C. 154(b) by 0 days.

(21) Appl. No.: 15/306,560

(22) PCT Filed: Sep. 29, 2014

(86) PCT No.: PCT/US2014/058035
§ 371 (c)(1),
(2) Date: Oct. 25, 2016

(87) PCT Pub. No.: WO2016/053238
PCT Pub. Date: Apr. 7, 2016

(65) Prior Publication Data
US 2017/0198572 A1  Jul. 13, 2017

(51) Int. Cl.
*E21B 49/00* (2006.01)
*E21B 47/00* (2012.01)
(Continued)

(52) U.S. Cl.
CPC .............. *E21B 49/00* (2013.01); *E21B 43/26* (2013.01); *E21B 47/00* (2013.01); *G01V 1/288* (2013.01);
(Continued)

(58) Field of Classification Search
CPC .......... E21B 47/12; E21B 47/14; E21B 49/00; G01V 1/288; G01V 1/40–52
(Continued)

(56) References Cited

U.S. PATENT DOCUMENTS 5,377,104 A * 12/1994 Sorrells ............... E21B 41/0057
702/11
5,503,225 A * 4/1996 Withers ................. B09B 1/008
166/250.1

(Continued)

OTHER PUBLICATIONS

PCT; "Notification of Transmittal of the International Search Report and the Written Opinion of the International Searching Authority, or the Declaration"; cited in PCT/US2014/058035; dated Jun. 23, 2015; 13 pages.

(Continued)

*Primary Examiner* — Tara Mayo-Pinnock
(74) *Attorney, Agent, or Firm* — Sheppard Mullin Richter & Hampton LLP

(57) ABSTRACT

Seismic based fracking fluid disposal can in an example embodiment include selecting a first disposal site of a plurality of disposal sites to receive fracking fluid from a fracking site; measuring, via a seismic sensor, seismic waves associated with the first disposal site; and assigning at least some of the fracking fluid from the first disposal site to a second disposal site of the plurality of disposal sites based on the measured seismic waves.

11 Claims, 3 Drawing Sheets

(51) Int. Cl.
*G01V 1/30* (2006.01)
*G01V 1/28* (2006.01)
*E21B 43/26* (2006.01)

(52) U.S. Cl.
CPC ........... *G01V 2210/1234* (2013.01); *G01V 2210/1429* (2013.01); *G01V 2210/646* (2013.01); *G01V 2210/65* (2013.01)

(58) Field of Classification Search
USPC ............... 405/53, 54; 166/250.01, 250.1
See application file for complete search history.

(56) References Cited

U.S. PATENT DOCUMENTS

| | | | | |
|---|---|---|---|---|
| 5,963,508 | A * | 10/1999 | Withers | G01V 1/008 166/250.1 |
| 6,980,940 | B1 * | 12/2005 | Gurpinar | E21B 43/00 166/250.16 |
| 8,041,510 | B2 | 10/2011 | Dasgupta | |
| 8,605,544 | B1 | 12/2013 | Baig et al. | |
| 2005/0203723 | A1 * | 9/2005 | Geehan | E21B 41/005 703/6 |
| 2005/0284625 | A1 * | 12/2005 | Rodney | E21B 37/08 166/250.01 |
| 2010/0098492 | A1 * | 4/2010 | Dickinson, III | B65G 5/005 405/57 |
| 2011/0042080 | A1 * | 2/2011 | Birchwood | G01V 1/50 166/254.2 |
| 2011/0120702 | A1 | 5/2011 | Craig et al. | |
| 2011/0214869 | A1 | 9/2011 | Beasley | |
| 2011/0298610 | A1 * | 12/2011 | Etkin | H04L 29/08792 340/539.3 |
| 2012/0318500 | A1 | 12/2012 | Urbancic et al. | |
| 2013/0081805 | A1 | 4/2013 | Bradford et al. | |
| 2013/0201787 | A1 | 8/2013 | Vermilye et al. | |
| 2013/0215712 | A1 | 8/2013 | Geiser et al. | |
| 2013/0215717 | A1 * | 8/2013 | Hofland | G01V 1/306 367/59 |
| 2014/0100786 | A1 | 4/2014 | Ma et al. | |
| 2014/0278120 | A1 | 9/2014 | Kahn et al. | |

OTHER PUBLICATIONS

Slota-Valim ~ "Seismic and well log data as a source for the calculation of elastic properties of rock media . . . " ~ Oil and Gas Institute ~ n8 ~ 2013 ~ 5 pages.

* cited by examiner

SEISMIC BASED FRACKING FLUID DISPOSAL

CLAIM FOR PRIORITY

The present application is a national stage filing under 35 U.S.C. § 371 of PCT application number PCT/US2014/058035, having an international filing date of Sep. 29, 2014, the disclosure of which is hereby incorporated by reference in its entirety.

BACKGROUND

Hydraulic fracturing (i.e., fracking) is a process used to mine underground natural gas and/oil. Fracking may use mixture of fluids (e.g., water) and/or solids (e.g., sand) that is injected underground into geographic formations such as rock and/or coal at a pressure sufficient to fracture the geographic formations and release trapped natural gases and/or oil.

DETAILED DESCRIPTION

Figure 1:
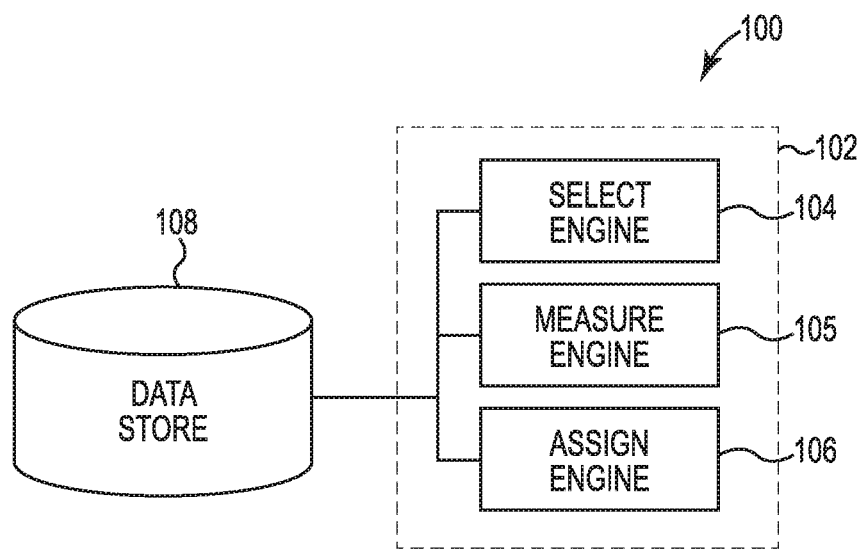
FIG. 1 illustrates a diagram of an example of a system for seismic based fracking fluid disposal according to the present disclosure.

Hydraulic fracturing (i.e., fracking) is a process used to mine underground natural gas and/or oil at a fracking site. A fracking site can, for example, include equipment, personal, among other items, at a location at which fracking occurs. Fracking may use mixture of fracking fluid including liquids (e.g., water) and/or solids (e.g., sand) that is injected underground into various geographic formations such as rock and/or coal at pressures sufficient to fracture the geographic formations and release trapped natural gases and/or oil.

Once utilized in the fracking process the fracking fluid may be disposed of (e.g., in accordance with governing environmental and/or safety regulations). Disposal may include injecting the fracking fluid into an underground well at a disposal site, for example, injection of fracking fluid to a depth underground that is below a depth of a water table in an effort to avoid contamination of water in the water table. However, such disposal, due a volume and/or pressure of the injected fracking fluid, may have unintended consequences including directly and/or indirectly causing undesired seismic activity (i.e., earthquakes) to be triggered, developed, and/or accentuated in areas at or near location(s) at which the fracking fluid is disposed. Such undesired seismic activity can be particularly evident (e.g., resulting in a comparatively large magnitude of seismic activity) in response to injection of the fracking fluid into or near an existing fault line. Therefore, it can be beneficial to monitor and/or mitigate undesired seismic actively associated with disposal of fracking fluid.

Some approaches attempting to monitor and/or mitigate seismic activity associated with fracking may utilize monitoring of seismic activity associated with a fracking site itself and/or monitoring seismic activity prior to performing fracking at a fracking site. However, such approaches may not account for variations in seismic activity, for example, variations in seismic activity occurring in response to disposal of fracking fluid, and/or may be limited to monitoring seismic activity at a single geographic location (e.g., at the fracking site), among other difficulties.

In contrast, examples of the present disclosure include methods, systems, and computer-readable media with executable instructions stored thereon for seismic based fracking fluid disposal. Seismic based fracking fluid disposal can, for example, include selecting a first disposal site of a plurality of disposal sites to receive fracking fluid from a fracking site, measuring, via a seismic sensor, seismic waves associated with the first disposal site, and assigning at least some of the fracking fluid from the first disposal site to a second disposal site of the plurality of disposal sites based on the measured seismic waves. Such seismic based fracking fluid disposal can increase safety associated with fracking (e.g., safety associated with fracking fluid disposal) and/or lessen environmental impact by comparatively reducing undesired seismic activity in contrast to other approaches that do not utilize seismic based fracking fluid disposal.

FIG. 1 illustrates a diagram of an example of a system 100 for seismic based fracking fluid disposal according to the present disclosure. The system 100 can include a data store 108 (e.g., analogous to data store 308 as referenced in FIG. 3), a seismic based fracking fluid disposal system 102, and/or a number of engines. The seismic based fracking fluid disposal system 102 can be in communication with the data store 108. The seismic based fracking fluid disposal system 102 can include a number of engines (e.g., a select engine 104, a measure engine 105, an assign engine 106, etc.). The seismic based fracking fluid disposal system 102 can include additional or fewer engines than illustrated to perform the various functions described herein.

The number of engines can include a combination of hardware and programming to perform a number of functions described herein (e.g., a select engine is to select a first disposal site of a plurality of disposal sites to receive fracking fluid from a fracking site, etc.). Each of the engines can include hardware or a combination of hardware and programming designated or designed to execute a module (e.g., a particular module). The programming can include instructions (e.g., software, firmware, etc.) stored in a memory resource (e.g., computer-readable medium) as well as a hard-wired program (e.g., logic).

The select engine 104 is to select a first disposal site of a plurality of disposal sites to receive fracking fluid from a fracking site. Disposal can occur in response to fracking at a fracking site and/or following fracking at a fracking site, among other possibilities. Disposal can include providing some or all of fracking fluid from a fracking site to at least one of a plurality of disposal sites such as to an underground well included in a first disposal site and/or to an underground well included in a second disposal site.

A first disposal site can be selected automatically (e.g., without user interaction and/or inputs) either randomly or based on measured seismic waves associated with a plurality of disposal sites. For example, measured seismic waves associated with a plurality of disposal sites can include respective baseline values of seismic waves (e.g., a respective greatest magnitude of seismic wave and/or greatest rate of occurrence of seismic waves, and/or other measured seismic wave information associated with a particular disposal site over a period of time during which measuring of the respective baseline value(s) occurs) associated with each of a plurality of disposal site. In some examples, a first disposal site can be selected based on having a comparatively lowest measured baseline value of seismic waves (e.g., a comparatively lowest magnitude and/or a comparatively lowest rate of occurrence of seismic waves) of the respective measured baseline values of seismic waves associated with a plurality of disposal sites.

In some examples, selection can include selection of two or more disposal sites of a plurality of disposal sites that each have baseline values of seismic waves below a threshold seismic level and/or have baseline values are comparatively lower than baseline values associated with other disposal sites included in a plurality of disposal sites. That is, disposal can, in some examples, include providing fracking fluid to two or more disposal sites, such as those having comparatively lowest baseline values of seismic waves, as described herein.

Notably, each of the plurality of disposal sites is an existing disposal site. An existing disposal site refers to a disposal site that is in existence prior to occurrence of fracking and that is capable to receive fracking fluid (e.g., a disposal site that is either coupled to a fracking site using the fracking fluid or capable of being coupled to the fracking site). That is, each of the disposal sites includes an underground well that can receive fracking fluid. Use of existing disposal sites can enable at least some of the fracking fluid to be assigned to a second disposal site that is distinct from a first disposal site based on measured seismic data, as described herein.

The measure engine 105 is to measure, via a seismic sensor, seismic waves associated with a first disposal site and/or a second disposal site. A seismic sensor refers to an instrument that is at least partially located underground and capable of measuring seismic waves including primary seismic waves (P-waves) and secondary seismic waves (S-waves). Measurement of P-waves and/or S-waves can promote identification of a direction of travel and/or point of origination of seismic waves (e.g., a distance to a point of origination of measured seismic waves identified using differing times associated with receipt of S-waves and/or P-waves by a seismic sensor). Examples of seismic sensors (i.e., seismometers) include permanent and/or retractable down-hole seismic sensors such as fiber-optic sensors, accelerometers, geophones, among other seismic sensors suitable to promote seismic based fracking fluid disposal. Such sensors can include short period, long period, and/or broadband sensors, among others suitable to convert ground motion into electrical voltage or other information suitable for output. The seismic sensors include digital seismic sensors and/or analog seismic sensors (e.g., an analog sensor coupled to an analog to digital converter).

The seismic sensors measure input information including a total number of seismic waves, respective magnitudes of seismic waves, a rate of occurrence of seismic waves (e.g., a duration of time between measuring respective seismic waves a particular disposal location), and/or a duration of seismic waves, among other information associated with seismic waves. The seismic sensor can output information (e.g., a digital stream of information) indicative of measured seismic waves and/or information associated with the seismic waves. For instance, an output of a seismic sensors, in combination with outputs from respective seismic sensors associated with the plurality of disposal sites can enable selection of a first disposal site to receive fracking fluid and/or assignment of at least some of the fracking fluid to a second disposal site, among other possibilities to promote seismic based fracking fluid disposal.

That is, in some examples, measurement of seismic waves at a plurality of disposal sites including seismic waves at a first disposal site can occur prior to selection of the first disposal site and/or promote selection of the first disposal site. For example, measure engine 105 can measure, via a plurality of seismic sensors, respective baseline values of seismic waves associated with a plurality of disposal sites. Examples of baseline values include a baseline rate of occurrence of seismic waves, an average magnitude of seismic waves, and/or an upper magnitude of seismic waves associated with a plurality of disposal sites, among other possible baseline values of seismic waves associated with a disposal site(s). Such baseline values can be provided to the select engine 104 to promote selection of the select a first disposal site of a plurality of disposal sites to receive fracking fluid from a fracking site (e.g., based on based on the measured baseline values provided from the measure engine 105).

However, the present disclosure is not so limited. Rather, measurement by the measure engine 105 can occur prior to, during, and/or in response to selection of a first disposal site by the select engine 104. Similarly, measurement can be continuous, periodic (e.g., hourly, daily, etc.), and/or can occur in response to an input (e.g., in response to detection of a presence of a seismic signal associated with a seismic wave, fracking fluid being provided to a disposal site, and/or in response to a user input).

For example, measurement of a particular disposal site (e.g., a first disposal site) can occur in response to fracking fluid being provided to the first disposal site. In this manner, the measure engine 105 can measure a baseline of a disposal site(s) and can measure the disposal site(s) in response to fracking fluid being provided to the disposal site(s) including a first disposal site and/or a second disposal site, among other possibilities.

Such measurements can promote assignment of at least some of the fracking fluid from a first disposal site to a second disposal site of the plurality of disposal sites based on the measured seismic waves. That is, a comparatively greater magnitude of seismic wave can be indicative of a comparatively greater magnitude of an underground fault and/or a comparatively greater magnitude of seismic activity. For instance, assignment of the fracking fluid can occur in response to at least one of the disposal sites (e.g., a first disposal site) having a measured seismic wave (e.g., a value of the measured seismic wave) that satisfies (e.g., meets or exceeds) a threshold seismic level. Put another way, assignment of at least some of the fracking fluid can occur in response to a first disposal site satisfying a threshold seismic level.

The threshold seismic level refers to a particular value (e.g., a value predetermined prior to commencing fracking) such as a suitable rate occurrence of seismic waves (e.g., three distinct seismic waves occurring over a period of time such as an hour or a day) or magnitude of seismic wave(s). In some examples, a threshold seismic level is a rate of increase in magnitudes of the seismic waves. For instance, a disposal site experiencing a given number of seismic waves over a first period of time (e.g., two distinct seismic waves) that experiences a comparatively higher number of seismic waves over a second period of time (e.g., 5 distinct seismic over a period of time that is one hour different than the first period of time) waves may satisfy a rate of increase (e.g. an increase of no more than one seismic wave per a given period of time) and/or a threshold total number of seismic waves over a given period of time (e.g., no more than 3 seismic waves over a given period of time).

Similarly, in some examples, the threshold seismic level can be a particular magnitude (e.g., a magnitude as measured on a Richter scale), a particular rate of increase in magnitudes over a period of time (e.g., for subsequently measure seismic waves), a particular rate of occurrence of seismic waves, a particular intensity (e.g., as measured on a Rossi-Forel scale), and/or a particular rate of increase in intensity over a period of time. For instance, in some examples, measurement of a seismic wave above a threshold seismic level (e.g., having a 2.5 magnitude on the Richter scale) would satisfy a threshold seismic level (e.g., corresponding to a 2.0 magnitude on the Richter scale). Similarly, in some examples, a first measured magnitude of a seismic wave (e.g., a magnitude of 1.3 on a Richter scale) can be measured and a second measured magnitude of another seismic wave (e.g., a seismic wave that is subsequent to the first seismic wave) can measured (e.g., 2.1). In such an example, the rate of increase (0.7 magnitude increase over a period of time) of the measured magnitudes of the respective seismic waves can satisfy a threshold seismic level (e.g., 0.3 magnitude increase over a period of time and/or between subsequently measured seismic waves).

In some examples, fracking at a fracking site can be stopped (e.g., use and disposal of fracking fluid can be stopped) in response to each of a plurality of disposal sites satisfying a threshold seismic level. In this manner, seismic activity that is directly and/or indirectly caused by disposal of fracking fluid from the fracking site can be curtailed in an effort to mitigate seismic activity to an acceptable level below the threshold seismic level. Alternatively, fracking may be stopped when seismic waves associated with a particular disposal site satisfy a stop threshold level (e.g., a stop threshold level equal to a magnitude of 6.0 on a Richter scale).

An assign engine 106 can assign at least some of the fracking fluid from a first disposal site to a second disposal site of the plurality of disposal sites based on the measured seismic waves. Assignment of at least some of the fracking fluid to a second disposal site can occur in response to determining that measured seismic waves associated with the first disposal site satisfy (e.g., meet or exceed) a threshold seismic level, among other possibilities. That is, the assign engine 106 can assign at least some of the fracking fluid from the first disposal site to a second disposal site of the plurality of disposal sites based on at least one of the disposal sites, such as the first disposal site, has measured seismic wave that satisfies a threshold seismic level.

Figure 2:
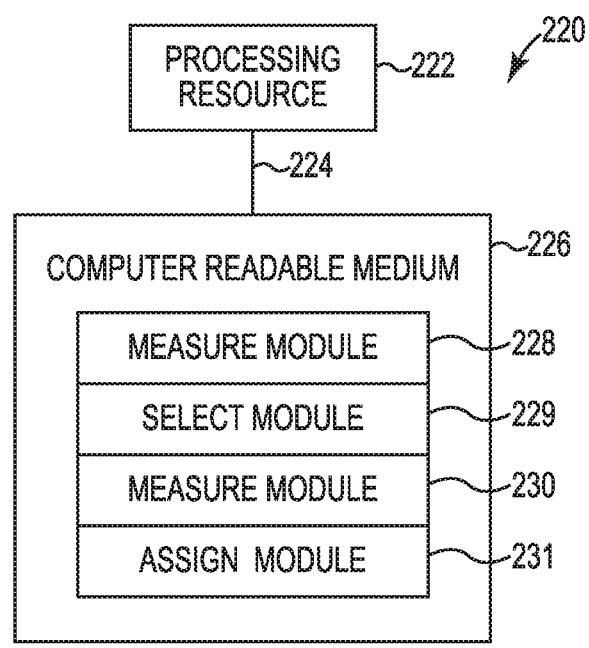
FIG. 2 illustrates a diagram of an example of a computing device according to the present disclosure.

FIG. 2 illustrates a diagram of an example of a computing device for seismic based fracking fluid disposal according to the present disclosure. The computing device 220 can utilize software, hardware, firmware, and/or logic to perform a number of functions described herein.

For example, the computing device 220 can be a combination of hardware and instructions for seismic based fracking fluid disposal. The hardware, for example can include a processing resource 222 and/or a memory resource 226 (e.g., computer-readable medium (CRM), data store, etc.) A processing resource 222, as used herein, can include a number of processors capable of executing instructions stored by a memory resource 226. Processing resource 222 can be integrated in a single device or distributed across multiple devices (e.g., multiple servers). The instructions (e.g., computer-readable instructions (CRI)) can include instructions stored on the memory resource 226 and executable by the processing resource 222 to implement a desired function (e.g., measure respective baseline values of seismic waves associated with a plurality of disposal sites, etc.).

The memory resource 226 can be in communication with a processing resource 222. A memory resource 226, as used herein, can include a number of memory components capable of storing instructions that can be executed by processing resource 222. Such memory resource 226 can be a non-transitory CRM. Memory resource 226 can be integrated in a single device or distributed across multiple devices. Further, memory resource 226 can be fully or partially integrated in the same device as processing resource 222 or it can be separate but accessible to that device and processing resource 222. Thus, it is noted that the computing device 220 can be implemented as part of or in conjunction with the systems, links, disposal sites, data stores, fracking sites, as described herein.

The memory resource 226 can be in communication with the processing resource 222 via a communication link (e.g., path) 224. The communication link 224 can be local or remote to a computing device associated with the processing resource 222. Examples of a local communication link 224 can include an electronic bus internal to a computing device where the memory resource 226 is one of volatile, non-volatile, fixed, and/or removable storage medium in communication with the processing resource 222 via the electronic bus.

The memory resource 226 can include a number of modules such as a measure module 228, a select module 229, a measure module 230, an assign module 231, etc. The number of modules 228, 229, 230, 231 can include CRI that when executed by the processing resource 222 can perform a number of functions. The number of modules 228, 229, 230, 231 can be sub-modules of other modules. For example, the measure module 228 and the select module 229 can be sub-modules and/or contained within the same computing device. Similarly, the measure module 228 and the measure module 230 can be sub-modules and/or contained within the same computing device. In another example, the number of modules 228, 229, 230, 231 can comprise individual modules at separate and distinct locations (e.g., CRM, etc.).

Each of the number of modules 228, 229, 230, 231 can include instructions that when executed by the processing resource 222 can function as a corresponding engine, including those as described herein. For example, the measure module 230 can include instructions that when executed by the processing resource 222 can function as a measure engine 105, for instance, to measure seismic waves associated with a first disposal site. Similarly, a select module 229 can function as the select engine 104 to a select engine to select a first disposal site of a plurality of disposal sites to receive fracking fluid from a fracking site. That is, fracking fluid is disposed of at a first disposal site (e.g., a first disposal site).

The measure module 228 can include instructions that when executed by the processing resource 222 can measure respective baseline values of seismic waves associated with a plurality of disposal sites. That is, a particular baseline value of seismic waves can be measured for each of the plurality of disposal sites.

The select module 229 can include instructions that when executed by the processing resource 222 can select a first disposal site of the plurality of disposal sites to receive fracking fluid from a fracking site, based on the measured baseline values, for example, the respective baseline values of seismic waves measured by measure module 228. For example, the select module 229 can select a first disposal site(s) having comparatively lowest baseline values of seismic waves to receive at least an amount (e.g., at least some of a total volumetric flow) of fracking fluid output (e.g., used fracking fluid) from a fracking site.

The measure module 230 can include instructions that when executed by the processing resource 222 can measure respective baseline values of seismic waves associated with a plurality of disposal sites and can measure seismic waves associated with the first disposal site. The assign module 231 can include instructions that when executed by the processing resource 222 can assign at least some of the fracking fluid from the fracking site to a second disposal site of the plurality of disposal sites based on the first disposal site having a measured seismic wave that satisfies a threshold seismic level.

Assignment of at least some of the fracking fluid from a first disposal site to a second disposal site can, in some examples, occur automatically (e.g., without user interaction and/or inputs) to remediate or otherwise attempt to mitigate seismic activity such as seismic activity associated with the first disposal site. Conversely, when a first disposal site(s) does not satisfy threshold seismic level then fracking fluid can continue to be provided to the first disposal site (e.g., to at least one of the plurality of disposal sites). Notably, while a single threshold seismic level can be applicable to two of more disposal sites the present disclosure is not so limited. That is, any suitable total number of threshold seismic level(s) may be used. For example, two disposal sites can have each have a respective threshold seismic level. In this manner, a particular threshold seismic level can be associated with at least one of the plurality of disposal sites (e.g., a first disposal site) to promote seismic based fracking fluid disposal.

Figure 3:
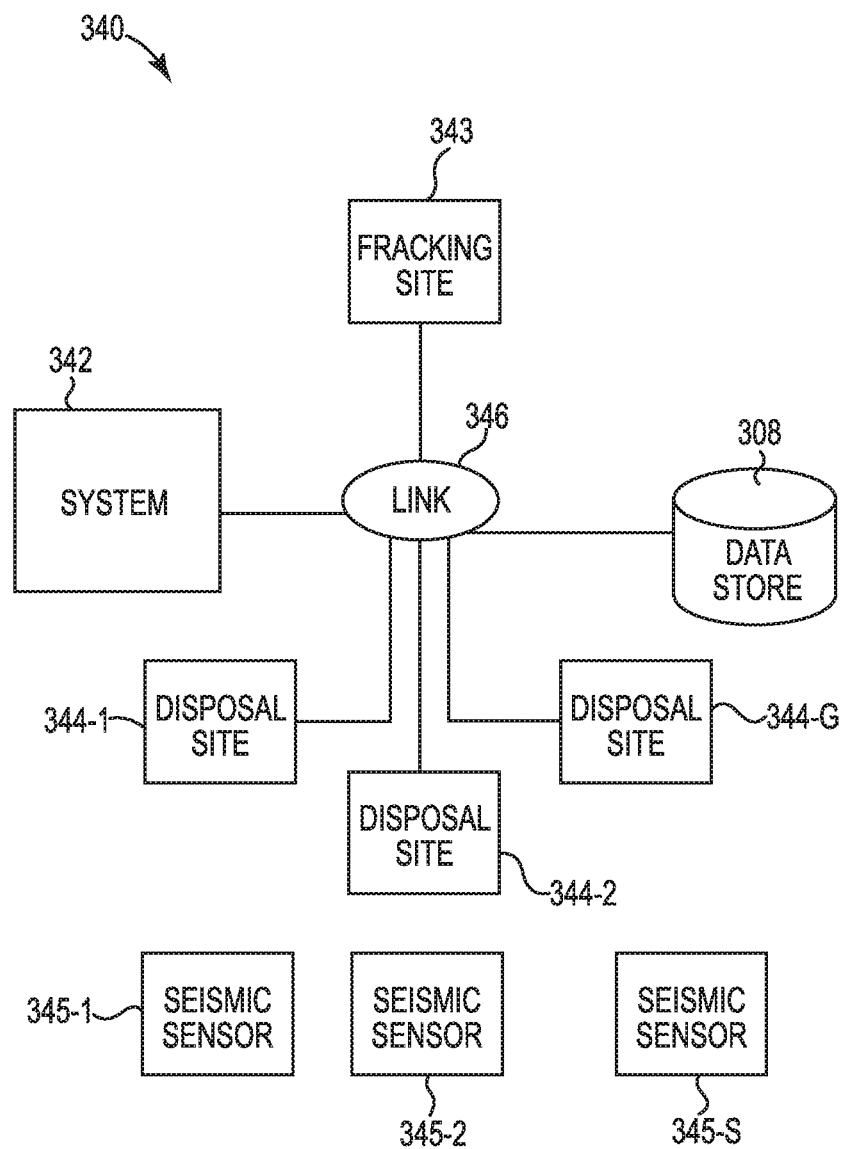
FIG. 3 illustrates an example of an environment in which various example processes can be implemented for seismic based fracking fluid disposal according to the present disclosure.

FIG. 3 illustrates an example of an environment 340 in which various example processes can be implemented for seismic based fracking fluid disposal according to the present disclosure. The environment 340 is shown to include a system 342 for seismic based fracking fluid disposal, a fracking site 343, disposal sites 344-1, 344-2, ..., 344-G, seismic sensors 345-1, 345-2, ..., 345-S, a data store 308, and a link 346.

The system 342 for seismic based fracking fluid disposal can represent different combinations of hardware or hardware and instructions to promote seismic based fracking fluid disposal. The system 342 for seismic based fracking fluid disposal can include a computing device (not shown), for instance, computing device 220 as discussed with respect to FIG. 2. The system 342 can include engines analogous to engines described with respect to FIG. 1. For example, the system 342 can include a select engine, measure engine and assign engine, as described herein with respect to FIG. 1, among other engines.

In various examples, the fracking site 343 is separate and distinct from the disposal sites 344-1, ..., 344-G. As described herein, being separate and distinct refers to an environment being physically separate and/or having separate network resources with respect to each other. In this manner, a disposal site can receive (e.g., remotely receive) a fracking fluid and/or have respective seismic waves (e.g., seismic sensors) associated therewith as compared to a fracking site. However, the present disclosure is not so limited. Seismic sensors 345-1, ..., 345-S and disposal sites 344-1, ..., 344-G can be can be at the same location. Being at the same location can refer to being included in a common building and/or being in a common geographic location within a relative physical proximity (e.g., within 100 feet of each other) and/or experiencing the same or substantially similar seismic waves at substantially the same time. For instance, each of the disposal sites 344-1, ..., 344-G can have a respective seismic sensor of the seismic sensors 345-1, 345-2, ..., 345-S at that same location.

Link 346 (e.g., a network) represents a cable, wireless, fiber optic, and/or remote connection via a telecommunication link, an infrared link, a radio frequency link, and/or other connectors or systems that provide electronic communication to communicate instructions between the system 342 for seismic based fracking fluid disposal, the fracking site 343, the disposal sites 344-1, ..., 344-G, the seismic sensors 345-1, ..., 345-S, and/or the data store 308. That is, the link 346 can, for example, include a link to an intranet, the Internet, or a combination of both, among other communication interfaces. The link 346 can also include intermediate proxies, for example, an intermediate proxy server, routers, switches, load balancers, and the like. However, the present disclosure is not so limited. That is, link 346 can represent a physical connection such as piping, instrumentation, and/or infrastructure between the fracking site 343 and the disposal sites 344-1, ..., 344-G to communicate fracking fluid between the fracking site 343 and the disposal sites 344-1, ..., 344-G.

Figure 4:
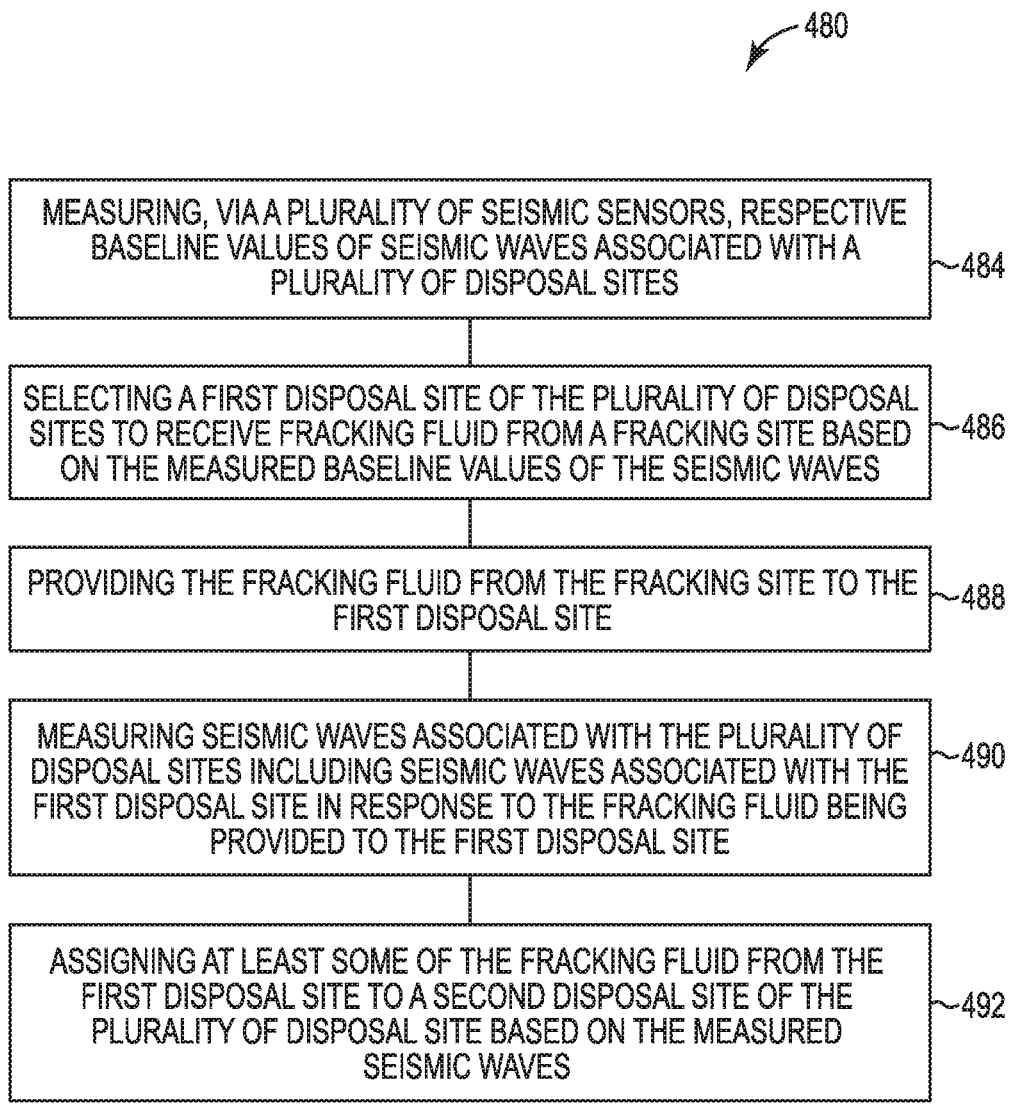
FIG. 4 illustrates a flow diagram of an example of a method for seismic based fracking fluid disposal according to the present disclosure.

FIG. 4 illustrates a flow diagram of an example of a method for seismic based fracking fluid disposal according to the present disclosure. As shown at 484, in various examples, the method 480 can include measuring, via a plurality of seismic sensors, respective baseline values of seismic waves associated with a plurality of disposal sites, as described herein. For example, each of the plurality of disposal sites can have a respective seismic sensor associated therewith. In such an example, measuring can include measuring seismic waves associated with each of the plurality of disposal sites.

The method 480 can include selecting a first disposal site of the plurality of disposal sites to receive fracking fluid from a fracking site based on the measured baseline values of the seismic waves, as shown at 486. Selecting refers to selection of a first disposal site to receive at least some of the fracking fluid from a frack site and causing the at least some of the fracking fluid (e.g., a fluidic flow of fracking fluid) to be received by the first disposal site.

As shown at 488, the method 480 can include providing the fracking fluid from the fracking site to the first disposal site. For example, fracking fluid can be provided from the fracking site via physical infrastructure, such as that contained within a link, as described herein, as a fluidic flow(s) of fracking fluid to at least one of the disposal sites. Providing the fracking fluid can occur in response to selecting a first disposal site, among other possibilities.

The method 480 can include measuring seismic waves associated with the plurality of disposal sites including seismic waves associated with the first disposal site in response to the fracking fluid being provided to the first disposal site, as shown at 490. In some examples, the method 480 can include measuring seismic waves associated with each of the plurality of disposal sites. Put another way, the method 480 can include measuring respective seismic waves associated with each of the plurality of disposal sites to promote selection of a first disposal site and/or assignment of at least some of the fracking fluid to a second disposal site.

As shown at 492, the method 480 can include assigning at least some (e.g., all) of the fracking fluid from the first disposal site to a second disposal site of the plurality of disposal site based on the measured seismic waves (e.g., based on the measured seismic waves associated with a disposal site that satisfy a threshold seismic level). Assigning refers to assignment of a second disposal site (e.g., distinct from the first disposal site associated with seismic waves that satisfy a threshold seismic level) to receive at least some of the fracking fluid from a frack site and causing the at least some of the fracking fluid (e.g., a fluidic flow of fracking fluid) to be received by the second disposal site. For example, the method 480 can, in some examples, include assigning at least some of the fracking fluid to a second disposal site having a comparatively lowest magnitude of seismic waves in an effort to remediate or otherwise mitigate seismic waves and/or seismic waves at a location of the first disposal site.

In some examples, the method can include including displaying an indication of measured baseline value(s) of a disposal site(s), a disposal site(s) selected to receive fracking fluid, and/or a measured values of seismic waves associated with a disposal site(s), among other information. Displaying, for example, can include causing a display in response to receipt of selection of a disposal site to receive fracking fluid and/or assignment of a second disposal site to receive fracking fluid, among other possibilities to promote seismic based fracking fluid disposal.

In the foregoing detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

The figures herein follow a numbering convention in which the first digit corresponds to the drawing figure number and the remaining digits identify an element or component in the drawing. For example, reference numeral 102 may refer to element "02" in FIG. 1 and an analogous element may be identified by reference numeral 202 in FIG. 2. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense. Further, as used herein, "a number of" an element and/or feature can refer to one or more of such elements and/or features.

As used herein, "logic" is an alternative or additional processing resource to perform a particular action and/or function, etc., described herein, which includes hardware, e.g., various forms of transistor logic, application specific integrated circuits (ASICs), etc., as opposed to computer executable instructions, e.g., software firmware, etc., stored in memory and executable by a processor.

What is claimed:

1. A method comprising:
   measuring, via a plurality of seismic sensors, seismic waves associated with a plurality of disposal sites, wherein the plurality of seismic sensors includes at least one of fiber optic sensors or accelerometers;
   determining, based on the seismic waves associated with the plurality of disposal sites, a baseline seismic wave for each of the plurality of disposal sites, wherein the baseline seismic wave includes at least one of a baseline rate of seismic occurrence, an average magnitude of seismic waves, or an upper magnitude of seismic waves at each of the plurality of disposal sites;
   selecting a first disposal site from the plurality of disposal sites to receive a fracking fluid from a fracking site, wherein the first disposal site has the lowest baseline seismic wave in the plurality of disposal sites;
   continuously measuring, via the plurality of seismic sensors, seismic waves associated with the first disposal site in response to the first disposal site receiving the fracking fluid the fracking site; and
   assigning at least a portion of the fracking fluid from the first disposal site to a second disposal site from the plurality of disposal sites in response to the measured seismic waves associated with the first disposal site satisfying a threshold seismic level, wherein the second disposal site is seismically distinct from the first disposal site, and the threshold seismic level is a particular rate of increase in magnitudes of seismic waves.

2. The method of claim 1, wherein assigning the at least the portion of the fracking fluid from the first disposal site to the second disposal site occurs automatically in response to the first disposal site satisfying the threshold seismic level.

3. The method of claim 1, wherein the plurality of seismic sensors are underground seismic sensors.

4. The method of claim 1, wherein the plurality of seismic sensors measure primary seismic waves and secondary seismic waves.

5. The method of claim 1, wherein the plurality of seismic sensors further includes geophones.

6. The method of claim 1, where the plurality of seismic sensors are digital sensors.

7. The method of claim 1, where the plurality of seismic sensors are analog sensors coupled to analog to digital converters.

8. The method of claim 1, wherein the plurality of disposal sites are existing disposal sites that have a capability to receive the fracking fluid from the fracking site.

9. The method of claim 1, wherein the first disposal site includes an underground well to receive the fracking fluid.

10. The method of claim 1, wherein the second disposal site includes an underground well to receive the fracking fluid.

11. The method of claim 1, wherein a disposal site of the plurality of disposal sites has a respective seismic sensor to measure respective seismic waves associated with the disposal site.

* * * * *